United States Patent [19]
Lessing

[11] Patent Number: 5,594,239
[45] Date of Patent: Jan. 14, 1997

[54] MEASURING SYSTEM FOR MONITORING BUILDINGS, TERRAIN SECTIONS OR THE LIKE

[75] Inventor: Rainer Lessing, Overath, Germany

[73] Assignee: SICOM, Langenfeld, Germany

[21] Appl. No.: 330,130

[22] Filed: Oct. 25, 1994

[51] Int. Cl.$^6$ ........................................... H01J 5/16
[52] U.S. Cl. .................. 250/227.16; 73/774; 340/555
[58] Field of Search ................ 250/227.14, 227.16, 250/227.12, 227.15, 231.19; 385/13, 9; 340/555–557; 73/768, 774, 802, 803–805; 356/73.1

[56] References Cited

U.S. PATENT DOCUMENTS

| | | | |
|---|---|---|---|
| 4,775,216 | 10/1988 | Layton | 250/227.12 |
| 4,814,562 | 3/1989 | Langston | 250/227.14 |
| 4,931,771 | 6/1990 | Kahn | 250/227.14 |
| 5,049,855 | 9/1991 | Slemon et al. | 250/227.28 |

FOREIGN PATENT DOCUMENTS

| | | |
|---|---|---|
| 2692038 | 12/1993 | France . |
| 3506844 | 9/1986 | Germany . |
| 3902997 | 4/1990 | Germany . |

OTHER PUBLICATIONS

Advances in Instrumentation, Jun. 1987, Research Triangle Park, N.C. Fiber Optic Microbend Sensor, N. Lagakos et al, pp. 1241–1250.

Primary Examiner—Que T. Ve
Attorney, Agent, or Firm—Dennison, Meserole, Pollack & Scheiner

[57] ABSTRACT

The measuring system for monitoring buildings, terrain sections or the like consists of a beam waveguide bending sensor which has a multimode beam waveguide (GI) and is disposed in the shape of a loop. Several arc-shaped sensor sections (S) are disposed between support plates, which are movable in respect to the sensor sections and and fixedly connected with areas of the building or terrain sections. A light source and light receiver with an evaluation device for light subduing values are connected to the beam waveguide bending sensor. The beam waveguide bending sensor is disposed in the form of several loops. The beam waveguide bending sensor consists of gradient-index-multimode beam waveguide sections (GI) and step-index-multimode beam waveguide sections (SI) connected therewith, wherein the sensor sections (S) are formed by the gradient-index-multimode beam waveguide (GI).

4 Claims, 1 Drawing Sheet

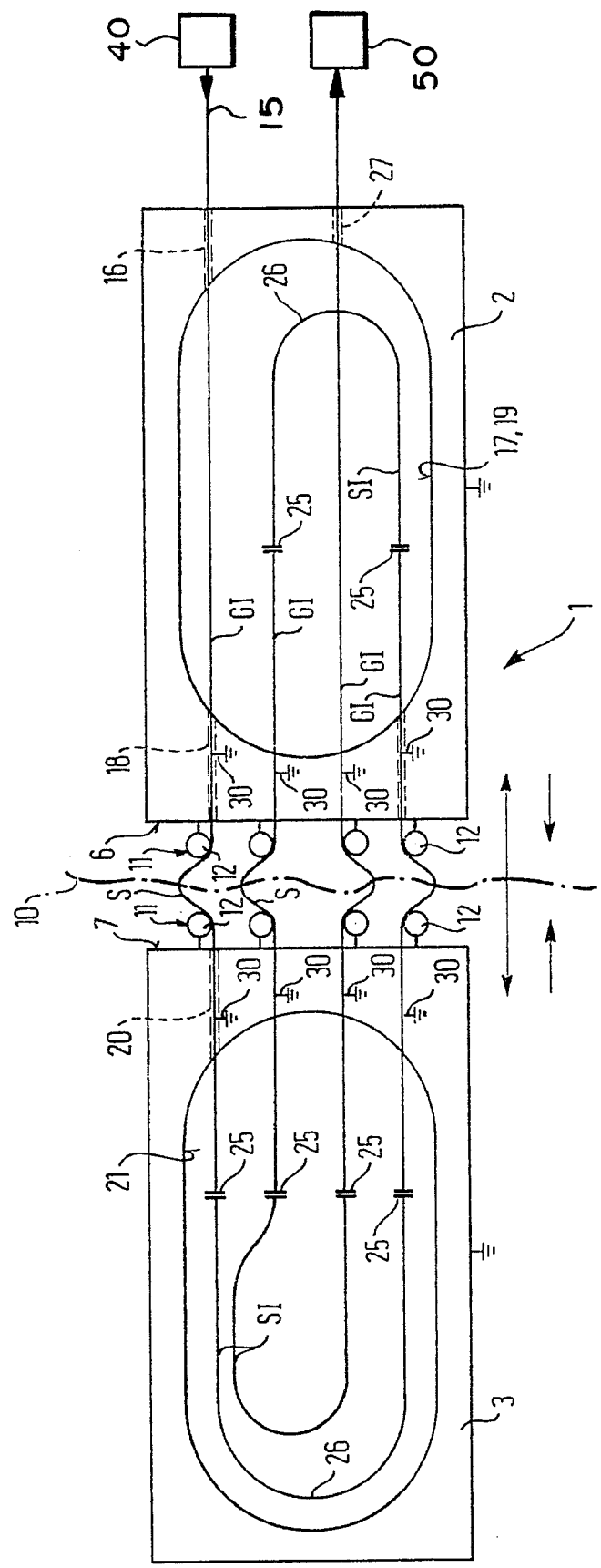

MEASURING SYSTEM FOR MONITORING BUILDINGS, TERRAIN SECTIONS OR THE LIKE

BACKGROUND OF THE INVENTION

The invention relates to a measuring system for monitoring buildings, terrain sections or the like.

A measuring system for monitoring buildings, having a beam waveguide bending sensor, is known from DE-PS 39 02 997. In this case the beam waveguide bending sensor as a whole consists of a gradient multimode beam waveguide GI. This beam waveguide is disposed in the shape of a loop. It has two arc-shaped sensor sections S between carriage-like support sections which can be moved toward each other and whose support plates are connected with the sections of the building to be checked. A light source is connected to one end of the beam waveguide and a light receiver with evaluation devices for light subduing values to the other end. In this case it is disadvantageous that such a measuring system can possibly be too insensitive and further that the sensitivity can not be considerably increased. This defect is essentially attributable to the fact that in such a beam waveguide the bending sensitivity is weakened after bending. In connection with the described prior art measuring system there is repeated curving of the beam waveguide, therefore the bending sensitivity is greatly reduced.

On the other hand, a step-index beam waveguide is known, which has a lesser bending sensitivity. However, it is not usable as a beam waveguide for the sensor path of the described measuring system.

OBJECT OF THE INVENTION

It is the object of the invention to provide a measuring system for monitoring buildings, terrain sections and the like, whose sensitivity is considerably increased.

This object of the invention is attained by means of the following features.

The measuring system includes a beam waveguide bending sensor which has a multimode beam waveguide (GI) and is disposed in the shape of a loop, several arc-shaped sensor sections (S) between support plates, which in respect to the sensor sections and are fixedly connected with areas of the building or terrain sections, and a light source, a light receiver with an evaluation device for light subduing values connected to the beam waveguide bending sensor, wherein the beam waveguide bending sensor is disposed in the form of several loops and the beam waveguide bending sensor consists of gradient-index-multimode beam waveguide sections (GI) and step-index-multimode beam waveguide sections (SI) connected therewith, wherein the sensor sections (S) are formed by the gradient-index-multimode beam waveguide (GI).

SUMMARY OF THE INVENTION

The measuring system in accordance with the invention has a considerably increased sensitivity. This is based on the fact that the bending sensitivity of the sensor section with the gradient multimode beam waveguide is maintained by downstream step-index beam waveguide sectors.

In accordance with an embodiment of the invention, each arc-shaped sensor section is guided by reversers whose exterior surfaces have a bending radius. The reversers are connected with ends of the support plates facing each other. Because of this the beam waveguide extends free of kinks on the exterior surface.

In accordance with a further embodiment of the invention, each support plate has a receiving chamber for a beam waveguide with inlets and outlets, wherein the beam waveguide can rest free of kinks and secured on the interior wall of the receiving chamber.

In accordance with a construction embodiment of the invention, the receiving chamber for the beam waveguide can have concentric interior walls for inner loops of the beam waveguide.

The invention will be described in detail below by means of an exemplary embodiment shown in the drawings.

BRIEF DESCRIPTION OF THE DRAWING

The FIGURE represents a schematic top view of a measuring system in accordance with the invention.

DETAILED DESCRIPTION OF THE INVENTION

The arrangement 1 shown in the FIGURE can be used for measuring relative movement of building sections, terrain sections, for example movement caused by fallen rocks.

The arrangement comprises two support plates 2, 3. These are fixedly connected with relatively moving building sections, which is schematically indicated in the drawing by arrows. The section of a building or, for example a fissure 10 in the terrain, to be monitored extends between the two facing ends 6, 7 of the support plates 2, 3.

Each support plate 2, 3 is preferably rectangular in shape. It consists of a rigid metal body.

Four turn-around devices 11 oriented toward each other, for example in the shape of tangs 12, are provided at the facing ends 6, 7. These tangs 12 are fixedly connected with the facing ends 6, 7. They have an exterior surface with a predetermined bending radius.

The beam waveguide 15 is connected to a light source 40, which feeds light in the direction of the arrows shown. Preferably the beam waveguide 15 is led via a guide 16, only indicated by dashed lines, to a receiving chamber 17. The receiving chamber can have an oval shape, for example, as shown. It is formed by milled cut-outs in the support plate 2.

Although, as shown, the beam waveguide 15 can cross the receiving chamber 17 in a straight line and guided to the other end, can exit via an outlet 18 at the support plate end 6. It is however to guide the beam waveguide 15, freely resting against the interior wall 19 of the receiving chamber 17, possibly once around the receiving chamber and only then only to guide it to the outlet 18.

Then the beam waveguide 15 freely extends via the tang 12 and is guided by its exterior wall in the form of an arc-shaped sensor path S to the oppositely located tang 12. Guided along the bending radius by the exterior tang surface, the beam waveguide 15 enters the receiving chamber 21 of the other support plate 3 via a guide 20. In the region of the receiving chamber 21, the beam waveguide 15 of the gradient beam waveguide (GI) type is connected by means of a splice 25—only shown schematically—with a beam waveguide of the step-index beam waveguide (SI) type.

The beam waveguide 15 then is furthermore disposed in a loop with the reverser 26. Here, again—as in the receiving chamber 17—it can also be guided freely resting against the wall of the receiving chamber 21. In the outgoing loop section, the beam waveguide 15 is again connected by means of a splice 25 with a beam waveguide 15 of the type GI. The latter returns via a second sensor section S, which is embodied as described above, into the receiving chamber 17 of the support plate 2. Here, too, an inlet is provided. In the receiving chamber 17, the beam waveguide 15 of the type GI is connected by a splice with a beam waveguide 15 of the type SI. The latter is guided by means of a reverser 26 and a splice 25 with a connecting beam waveguide 15 of the type GI to a further sensor path S. From there, the beam waveguide 15 of the type GI extends via a guide into the receiving chamber 21. There, it is connected via a splice 25 with a succeeding beam waveguide section SI. Finally, the beam waveguide GI returns to the receiving chamber 17 via a further splice 25 with a further sensor path S, and from there via an outlet 27 over the support plate 2 to the outside to a light receiving and evaluation unit 50.

The inner loops of the beam waveguide can also rest against a concentric interior wall, not shown, in the receiving chambers 17 to 21.

Instead of guiding the beam waveguide 15 in a double loop, as shown, it can also be guided in arbitrary multiple loops. The measuring sensitivity can be increased by the increasing number of loops. The limit is provided in that the exiting subdued light is reduced more and more and that possibly expensive transmitting and receiving devices must be employed.

It is of importance that a beam waveguide of the type GI is used in the area of the sensor section S and that a beam waveguide section of the type SI adjoins this, which the effect of the preceding beam waveguide sections, in which the light is concentrated because of bending. Afterwards the light is again homogeneously distributed over the beam waveguide cross section by the beam waveguide section SI. Types GI are to be used for the inlet and outlet sections of the beam waveguide 15.

The beam waveguide 15 must be fixedly connected with the support plates 2, 3 on both sides of the sensor path S, for example by adhesion. Adhesive spots 30 are schematically shown.

The monitoring system is capable to detect relative movement of the support plates 2, 3 and thus the relative movement of the building sections on which the support plates are fixed. As is clear from the FIGURE, the radius of curvature of the waveguides in the sensor sections decreases (when sections move away) more luminous power is radiated whereas, when the radius of curvature increases (sections move toward each other) less luminous power is radiated.

The receiver measures the amount of luminous power at the end of the waveguide outlet 27.

I claim:

1. A measuring system for monitoring the movement of building sections resulting from movement of terrain section relative movement, wherein a first and second support plate is fixed to a first and second building section comprising:

a first receiving chamber including a first gradient beam waveguide on said first support plate, a second receiving chamber including a first reversing step index beam waveguide on said second support plate;

said first gradient beam waveguide extending over a first arch shaped sensor path into said second receiving chamber;

first means for connecting the first gradient beam waveguide to the first reversing step index beam waveguide;

a second gradient beam waveguide extending over a second arch shaped sensor path into said first receiving chamber;

second means for connecting said first reversing step index beam waveguide to said second gradient beam waveguide;

a light source for feeding light to the first gradient beam waveguide;

a light receiving unit for receiving the light from said second gradient beam waveguide; and said light being attenuated in response to curvature changes of the first and second arch shaped sensor path.

2. The measuring system of claim 1, further including third means for connecting the second gradient beam waveguide to a second reversing step index beam waveguide for connecting said second reversing step index beam waveguide to a third gradient beam waveguide extending over a third arch shaped sensor path into the second receiving chamber; and fourth means for connecting the third gradient beam waveguide to a third step index beam waveguide and for connecting the third step index beam waveguide to a fourth gradient beam waveguide extending over a fourth arch shaped sensor path into the first receiving chamber.

3. The measuring system of claim 1 wherein each arch shaped sensor path is guided by the exterior wall of tangs so that the bending radius of each arch shaped sensor changes as a function of the movement of the terrain sections.

4. The measuring system of claim 1 wherein the light receiving unit operates to evaluate the amount of relative movement between terrain sections.

* * * * *